Jan. 8, 1924.

C. J. IVEN 1,480,266

BUMPER FOR MOTOR VEHICLES

Filed June 6, 1923

INVENTOR.
Charles J. Iven
BY
his ATTORNEYS.

Patented Jan. 8, 1924.

1,480,266

UNITED STATES PATENT OFFICE.

CHARLES J. IVEN, OF ROCHESTER, NEW YORK, ASSIGNOR TO J. H. SAGER COMPANY, OF ROCHESTER, NEW YORK, A CORPORATION OF NEW YORK.

BUMPER FOR MOTOR VEHICLES.

Application filed June 6, 1923. Serial No. 643,776.

*To all whom it may concern:*

Be it known that I, CHARLES J. IVEN, a citizen of the United States, and resident of Rochester, in the county of Monroe and State of New York, have invented certain new and useful Improvements in Bumpers for Motor Vehicles, of which the following is a specification.

The present invention relates to bumpers for motor vehicles and more particularly to the type in which the bumper is formed of two spaced bars secured together at their ends, an object of this invention being to provide an improved means of supporting the bars so that the ends of the bars will be more rigidly supported while, at the same time, providing for resiliency in said ends.

To these and other ends, the invention consists of certain parts and combinations of parts, all of which will be hereinafter described; the novel features being pointed out in the appended claims.

Figure 1:
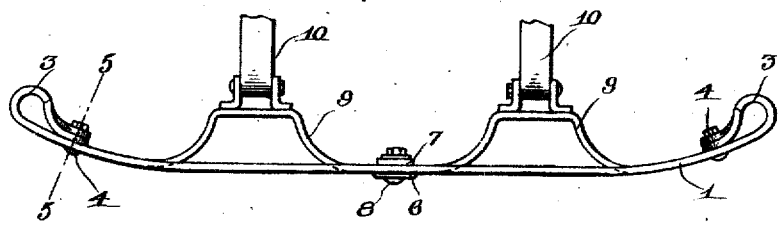
Fig. 1 is a plan view of a bumper constructed in accordance with this invention.
Figure 2:
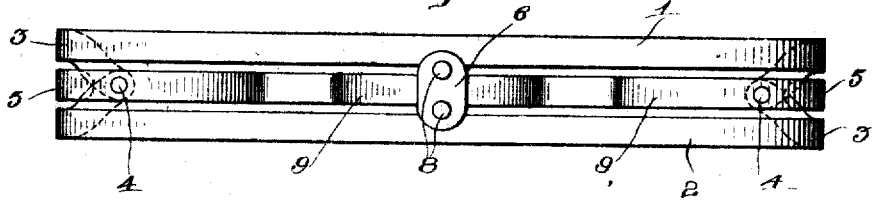
Fig. 2 is a front view.
Figure 3:
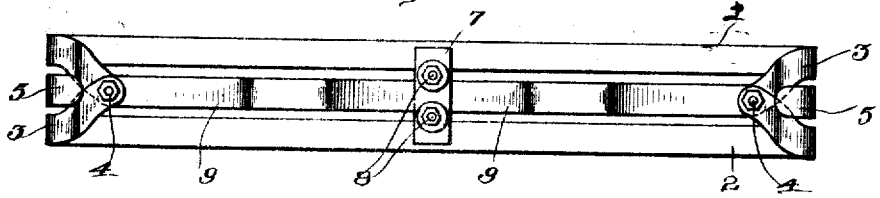
Fig. 3 is a rear view.

Referring more particularly to the drawings, 1 and 2 indicate two bars each formed, in this instance, of a steel strip of uniform diameter throughout and each having its opposite ends bent rearwardly, inwardly and forwardly at 3, the inwardly and forwardly extending portion of each bar being bent edgewise of the material toward the other bar and being secured by a bolt 4 to a like portion on such other bar.

In the embodiment illustrated in Figs. 1 to 3 and 5, the supporting means embodies a single strip of material arranged with its flat faces upright and secured by bolts 4 near opposite ends to and in front of the ends 3 to the ends of the two first named bars 1 and 2, the supporting bar being extended beyond the bolts and bent rearwardly and inwardly at 5, so as to provide further impact surfaces at the ends of the bumper and between the two bars 1 and 2. This intermediate or supporting bar may also be secured at its central portion to the two bumper bars 1 and 2 and to this end two clamping plates 6 and 7 are provided with two bolts 8 lying between the intermediate supporting bar and the bars 1 and 2, the plates projecting over the bars 1 and 2. Between the clamping plates 6 and 7 and the bolts or securing means 4, the intermediate or supporting bar is deflected or bent rearwardly at 9 and has these portions secured in any suitable manner to the vehicle as to the frame bars 10, each deflecting portion providing two arms extending forwardly, the end of one being connected to the fastening means or bolt 4, while the end of the other is connected to the clamps 6, 7 and 8.

Figure 4:
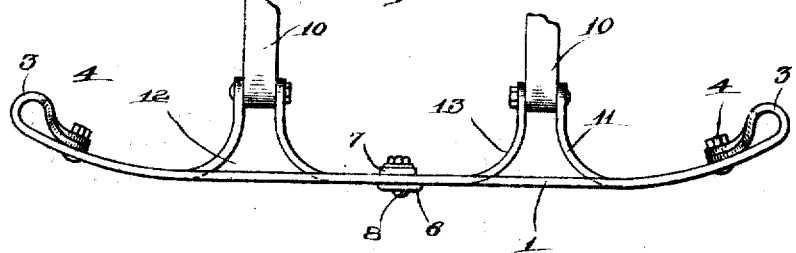
Fig. 4 is a view of the modification of the invention.
Figure 5:
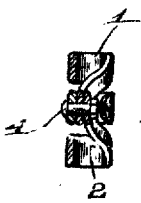
Fig. 5 is a section on the line 5—5, Fig. 1.

In the embodiment illustrated in Fig. 4 instead of making the supporting means in the form of a single bar the supporting means is formed of three pieces 11, 12 and 13, of strip metal. The pieces 11 and 12 are in the form of supporting arms proceeding outwardly from the vehicle frame 10 and secured by the bolts 4, being projected beyond the bolts, the projecting ends being bent rearwardly and inwardly as in the other embodiment. The member or piece 13 is secured at opposite ends of the side bars and forms two supporting arms, being connected to the bars 1 and 2 by the clamping plates 6 and 7.

From the foregoing it will be seen that there has been provided a bumper having two bumper bars formed from strips of sheet steel and lying in the same plane, each bumper bar having both ends bent rearwardly, inwardly and toward the other bar and fastened together, the fastening means also serving for securing a supporting means which extends preferably beyond the fastening means and in front of the two ends of the bumper bars and is bent rearwardly and inwardly. This arrangement provides for strengthening the ends of the bumper, while, at the same time, permitting resiliency in said ends. Furthermore, a greater amount of impact surface is provided at the ends of the bumper.

What I claim as my invention and desire to secure by Letters Patent is:

1. A bumper comprising two substantially parallel bars, arranged one above the other, each having its ends bent rearwardly, inwardly and toward the other, and supporting means for the bumper secured to said ends and also to the two bars at a point between the ends of each of the bars.

2. A bumper comprising two substantially parallel bars arranged one above the other, each having its ends bent rearwardly, inwardly and toward the other, and supporting means for the bumper secured to said ends, and projecting between the two bars, said supporting means projecting beyond the secured portions and being bent rearwardly and inwardly at the ends of the bumper.

3. A bumper comprising two bars arranged one above the other in spaced relation, each bar having both its ends bent rearwardly, inwardly and toward the other bar, and an intermediate bar lying in a plane between the first named bars and secured to and in front of the ends of the first two named bars.

4. A bumper comprising two bars arranged one above the other in spaced relation, each bar having both its ends bent rearwardly, inwardly and toward the other bar, and an intermediate bar lying in a plane between the first named bars and secured to and in front of the ends of the first two named bars, the ends of the intermediate bar being bent rearwardly.

5. A bumper comprising two bars arranged one above the other in spaced relation, each bar having both its ends bent rearwardly, inwardly and toward the other bar, and an intermediate bar lying in a plane between the first named bars and secured to and in front of the ends of the first two named bars, the ends of the intermediate bar being bent rearwardly and the central portion of the intermediate bar being secured to the first two named bars.

6. A bumper comprising two bars arranged one above the other in spaced relation, each bar having both its ends bent rearwardly, inwardly and toward the other bar, an intermediate bar lying in a plane between the first named bars and secured to and in front of the ends of the first two named bars and the central portion of the intermediate bar being secured to the first two named bars, and portions of the intermediate bar between the central secured portion and the secured ends being bent rearwardly to act as a supporting means for the bumper.

7. A bumper comprising two bars arranged one above the other in spaced relation, each bar having its ends bent rearwardly, inwardly and toward each other into the horizontal plane of the space between the two bars, and an intermediate bar lying in a plane between the first two named bars and secured to the inwardly turned ends of the first named bars within the vertical plane of the two first named bars, the central portion of the intermediate bar being secured to the first named two bars between the ends of each of said bars.

8. A bumper comprising two bars arranged one above the other in spaced relation, each bar having its ends bent rearwardly, inwardly and toward each other, and an intermediate bar lying in a plane between the first named bars and secured to the ends of the first named bars, the parallel portion of the intermediate bar being secured to the first two named bars at a point between the ends of each bar, and portions of the intermediate bar between the central portion and the secured end being bent rearwardly to act as a supporting means for the bumper.

CHARLES J. IVEN.